US010592874B1

(12) United States Patent
Nayfack

(10) Patent No.: US 10,592,874 B1
(45) Date of Patent: *Mar. 17, 2020

(54) SYSTEMS AND METHODS FOR THIRD PARTY PAYMENT AT POINT OF SALE TERMINALS

(71) Applicant: Worldpay, LLC, Symmes Township, OH (US)

(72) Inventor: Nicholas G. Nayfack, Hal Moon Bay, CA (US)

(73) Assignee: Worldpay, LLC, Symmes Township, OH (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/827,479

(22) Filed: Nov. 30, 2017

Related U.S. Application Data

(63) Continuation of application No. 14/739,250, filed on Jun. 15, 2015, now Pat. No. 10,438,177.

(51) Int. Cl.
*G06Q 20/08* (2012.01)
*G06Q 20/20* (2012.01)
*G06Q 20/40* (2012.01)

(52) U.S. Cl.
CPC ....... *G06Q 20/0855* (2013.01); *G06Q 20/202* (2013.01); *G06Q 20/405* (2013.01)

(58) Field of Classification Search
CPC ............ G06Q 20/0855; G06Q 20/202; G06Q 20/405; G06Q 20/14; G06Q 20/20; G06Q 20/32; G06Q 20/40; G06Q 20/34; G06Q 40/00; G06Q 10/00

USPC ......... 705/18, 39, 34, 21, 26.1, 64
See application file for complete search history.

(56) References Cited

U.S. PATENT DOCUMENTS

| | | | |
|---|---|---|---|
| 9,818,093 B1* | 11/2017 | Grier | G06Q 20/322 |
| 2003/0126036 A1* | 7/2003 | Mascavage, III | G06Q 20/02 705/26.1 |
| 2007/0194123 A1* | 8/2007 | Frantz | G06K 17/0022 235/462.45 |
| 2007/0288320 A1* | 12/2007 | Cooper | G06Q 10/067 705/348 |
| 2010/0257067 A1* | 10/2010 | Chan | G06Q 20/102 705/21 |
| 2011/0055033 A1* | 3/2011 | Chen | G06Q 20/20 705/18 |

(Continued)

*Primary Examiner* — Oludegun Goyea
(74) *Attorney, Agent, or Firm* — Bookoff McAndrews, LLC

(57) ABSTRACT

A point of sale terminal of a merchant includes a third party payment provider display area for payment using a third party payment provider. The point of sale terminal receives an authentication notification for a consumer from the third party payment provider. The consumer is authenticated using one or more of a personal identification number, an image of the consumer, a quick response code scanned from a mobile device of the consumer, or a code received via near field communications with the mobile device of the consumer. The point of sale terminal requests payment from the third party payment provider for a transaction with the consumer using the transaction amount and authentication information. The third party provider display area allows new payment modalities to be used at the point of sale terminal without requiring modification of the instructions for the point of sale terminal.

20 Claims, 5 Drawing Sheets

(56) References Cited

U.S. PATENT DOCUMENTS

| | | | |
|---|---|---|---|
| 2013/0048717 A1* | 2/2013 | Brendell | G06Q 20/325 |
| | | | 235/380 |
| 2014/0201085 A1* | 7/2014 | Brendell | G06Q 20/325 |
| | | | 705/64 |
| 2014/0279419 A1* | 9/2014 | Holman | G06Q 20/08 |
| | | | 705/39 |
| 2015/0002896 A1* | 1/2015 | Takasu | G06F 3/1209 |
| | | | 358/1.15 |
| 2015/0287006 A1* | 10/2015 | Hunter | H04L 67/28 |
| | | | 705/21 |
| 2015/0304330 A1* | 10/2015 | Soamboonsrup | G09B 5/08 |
| | | | 726/4 |
| 2016/0210612 A1* | 7/2016 | Tervo | G06Q 20/3255 |
| 2017/0011375 A1* | 1/2017 | Takasu | G07G 1/12 |

* cited by examiner

SYSTEMS AND METHODS FOR THIRD PARTY PAYMENT AT POINT OF SALE TERMINALS

CROSS-REFERENCE TO RELATED APPLICATION(S)

This patent application claims the benefit under 35 U.S.C. § 119 to U.S. Nonprovisional Patent application Ser. No. 14/739,250, filed on Jun. 15, 2015, the entirety of which is incorporated herein by reference.

TECHNICAL FIELD

The subject application teaches example embodiments that relate generally to providing third party payment capabilities at point of sale terminals.

BACKGROUND

Point Of Sale ("POS") terminals are used by merchants to accept consumer payments for goods or services. Existing POS terminals typically accept payments from consumers in the form of cash, check, or credit card transactions. POS terminals can also be configured to allow the use of coupons, vouchers, frequent user programs, gratuities, and so forth. However, POS terminals generally have to be updated via software or firmware in order to accept a new form of payment, which can be difficult and costly to implement thereby slowing the deployment of new payment modalities and new payment options for consumers.

SUMMARY

In an example embodiment, a point of sale terminal of a merchant includes an embedded controller having a processor, a memory in data communication with the processor for storing data and instructions, a network interface for data communications with a payment processing network, and a display that is configured to display a third party payment provider display area. The embedded controller receives an authentication notification from the third party payment provider via the network interface for authenticating a transaction with the merchant. The authentication notification can include identifying indicia of the consumer and can include a gratuity. The embedded controller receives a consumer authentication selection, sends a payment request that includes the consumer authentication selection to the third party payment provider, via the network interface, for the transaction with the consumer, and receives a payment confirmation from the third party payment provider. In an embodiment, the consumer authentication selection authenticates the consumer using the identifying indicia of the consumer. In an embodiment, the identifying indicia can be an image of the consumer, the image can be displayed in the third party payment provider display area, and the consumer is authenticated by a selection of the image of the consumer that is displayed. In an embodiment, the consumer authentication selection can be a personal identification number of the consumer or a code from the consumer's mobile device. In an embodiment the code can be a scanned quick response or QR code, or a near field communication code received from the mobile device. In an embodiment, the third party payment provider display area can be configured to support new payment modalities through data received over a network interface, where the data does not modify the instructions of the point of sale terminal in the memory.

In an example embodiment, a method includes presenting a third party payment provider display area on a point of sale terminal associated with a merchant, receiving a consumer authentication selection, sending a payment request to the third party payment provider for a transaction with the consumer at the point of sale terminal, and receiving a payment, by the merchant and from the third party payment provider, in response to the payment request. The method can further include receiving data for presenting a new payment modality in the third party payment provider display area, where the data does not modify an instruction of the point of sale terminal. Receiving a consumer authentication selection can include receiving one or more personal identification numbers from the consumer or a code from the consumer's mobile device. The code can be a scanned quick response, or QR, code from the display of the mobile device or a near field communication code received from the mobile device. The method can include receiving a notification at the point of sale terminal that the consumer has checked-in at the merchant with a third party payment provider. The notification can include identifying indicia of the consumer and/or a gratuity provided by the consumer when the consumer checked-in. The consumer authentication selection authenticates the consumer using the identifying indicia of the consumer. The identifying indicia of the consumer can be an image of the consumer, the image can be displayed in the third party payment provider display area on the point of sale terminal, and the consumer can be authenticated by a selection of the image of the consumer that is displayed in the third party payment provider display area. The third party payment provider display area on the point of sale terminal can be a web page that is configured to receive a payment amount of the transaction from the point of sale terminal, receive the consumer authentication selection, send the payment request for payment by the third party payment provider including the payment amount and the consumer authentication selection, received a confirmation of payment by the third party payment provider, and send a notification to the point of sale terminal of the confirmation of payment.

In an example embodiment, a computer-implemented payment processing method includes polling a third party payment processor for customer check-in data that is generated as a result of a customer check-in at a merchant, receiving the customer check-in data which includes authentication data for authenticating the customer at a point of sale terminal of the merchant, and sending the check-in data to the point of sale terminal of the merchant. The method includes receiving a payment request for payment by the third party payment processor, where the payment request includes result data from an authentication of the customer at the point of sale terminal of the merchant. The method includes sending a payment authorization request to the third party payment processor, receiving a payment confirmation from the third party payment processor, and sending a notification of payment to the point of sale terminal. The authentication data can include one or more digital images of the customer. The authentication result data can include a confirmation that the customer was authenticated with the digital image of the customer. The authentication result data can include a personal identification number or pin, a hash of a pin, a password, a hash of a password, a token associated with the merchant and the customer, a scanned code, a scanned QR code, a code provided by a mobile communication device, and a code provided in an near field communication session with a mobile communication device. The received customer check-in data can include gratuity data, and payment request from the point of sale terminal can include a gratuity based at least in part on the gratuity data. In an embodiment, the computer-implemented payment processing method can include sending data to the point of sale terminal for presenting a new payment modality in a third party payment provider display area, where the data does not modify an instruction of the point of sale terminal.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
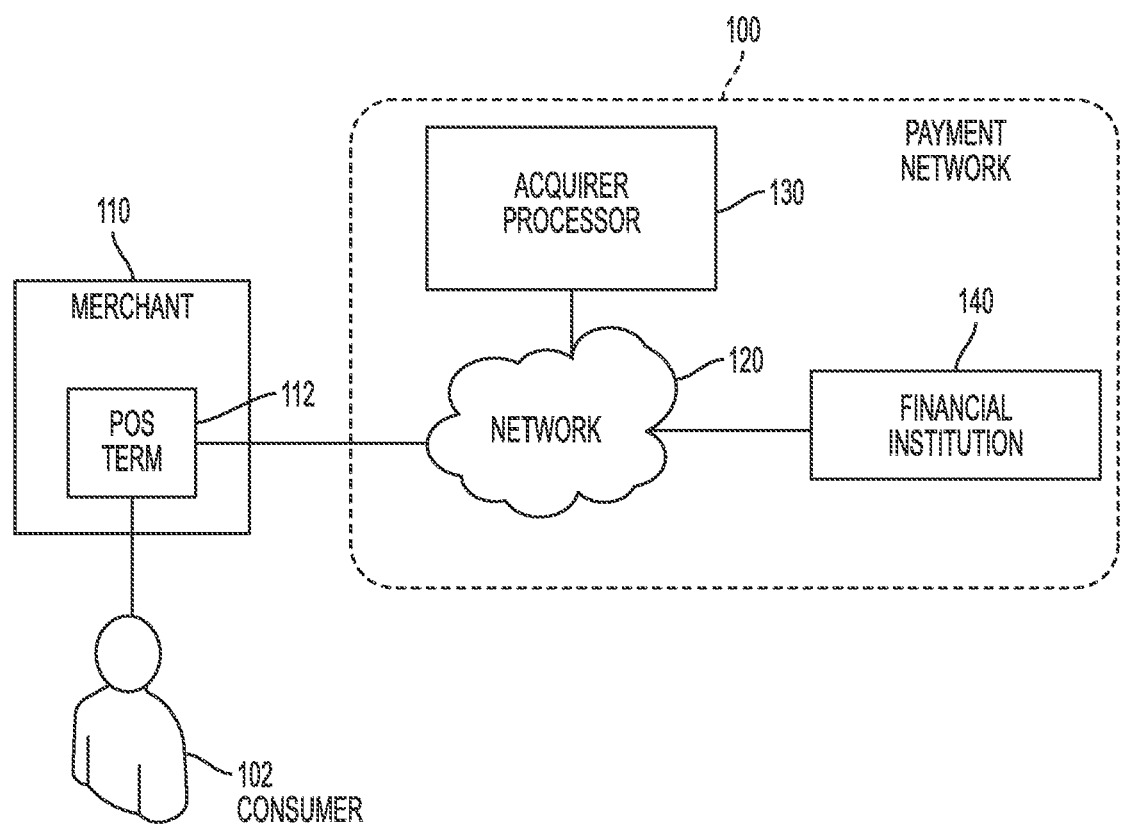
FIG. 1 is a diagram of an example point of sale terminal and an associated payment processing network.

Various non-limiting embodiments of the present disclosure will now be described to provide an overall understanding of the principles of the structure, function, and use of systems, apparatuses, devices, and methods disclosed herein related to third party payment at point of sale terminals. One or more examples of these non-limiting embodiments are illustrated in the selected examples disclosed and described in detail with reference made to FIGS. 1-5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

Point Of Sale ("POS") systems used by merchants generally accept payments from consumers in the form of cash, check, credit cards and so forth. POS systems can include one or more POS terminals and can include back office computing systems. POS systems and POS terminals can be specialized computing devices configured to send and receive financial transaction data, for example between a POS system and a POS terminal, or with a payment network provider such as an acquirer processor. Acquirer processors similarly can use specialized computing devices configured to send, receive, and process financial transaction data.

Turning to FIG. 1, a consumer 102, during the checkout process at a merchant's store, pays for goods or services from a merchant 110 at a POS terminal 112. If the consumer 102 pays by credit card, the transaction is processed through a payment network 100. Because a merchant 110 generally uses a different bank or financial institution 140 than the consumer 102, an acquirer processor 130 handles the financial transactions necessary to transfer payment between the financial institutions 140 of the consumer 102 and the merchant 110. The merchant 110 swipes the consumer's payment card at the POS terminal 112. For simplicity, a "payment card" or "payment vehicle" generally refers to any type of financial alternative to currency, such as credit cards, debit cards, smart cards, single-use cards, pre-paid cards, and the like. The POS terminal 112 sends a payment request across a network 120 to the acquirer processor 130. The acquirer processor 130 requests an electronic transfer of funds from the financial institution 140 associated with the payment vehicle of the consumer 102, and settles the received funds to the financial institution 140 associated with the merchant 110.

New payment modalities for purchasing goods and services enable consumers 102 to pay using forms of payment other than cash, check, or payment card. For example, online vendors accept payments via third party payment providers, that can be termed third party payment processors. Example third party payment providers include, but are not limited to ApplePay™, Android Pay™, PayPal™, and Samsung Pay™ among other suitable third party payment providers. Consumers 102 can pay for goods and services using their mobile computing device, such as an iPhone™ from Apple™, or an Android™ based smartphone. These new payment types can be beneficial to consumers 102 and merchants 110 alike. Consumers 102 can benefit from the convenience of using mobile payment systems. Merchants 110 can benefit from more economical transaction costs offered by third party payment providers. Many third party payment providers use digital wallets. Digital wallets provide flexibility to consumers 102, allowing consumer 102 to choose their preferred form of payment from one or more accounts configured in their digital wallet. For example, for any transaction, consumers 102 can choose whether to pay from a payment card, bank account, or line of credit in their digital wallet. Digital wallets also provide security to consumers 102 because the consumers' payment card and bank account numbers are not provided to a merchant 110 during checkout.

While POS terminals 112 at a merchant 110 can be configured to accept payments from third party payment providers, each new form of payment or third party payment provider, each POS terminal 112 at the merchant 110 would need to be updated, for example through a software or firmware update. Such perpetual updating and reconfiguring of POS terminals 112 can be difficult, expensive, and time consuming as each new payment option become available or changes over time.

Figure 2:
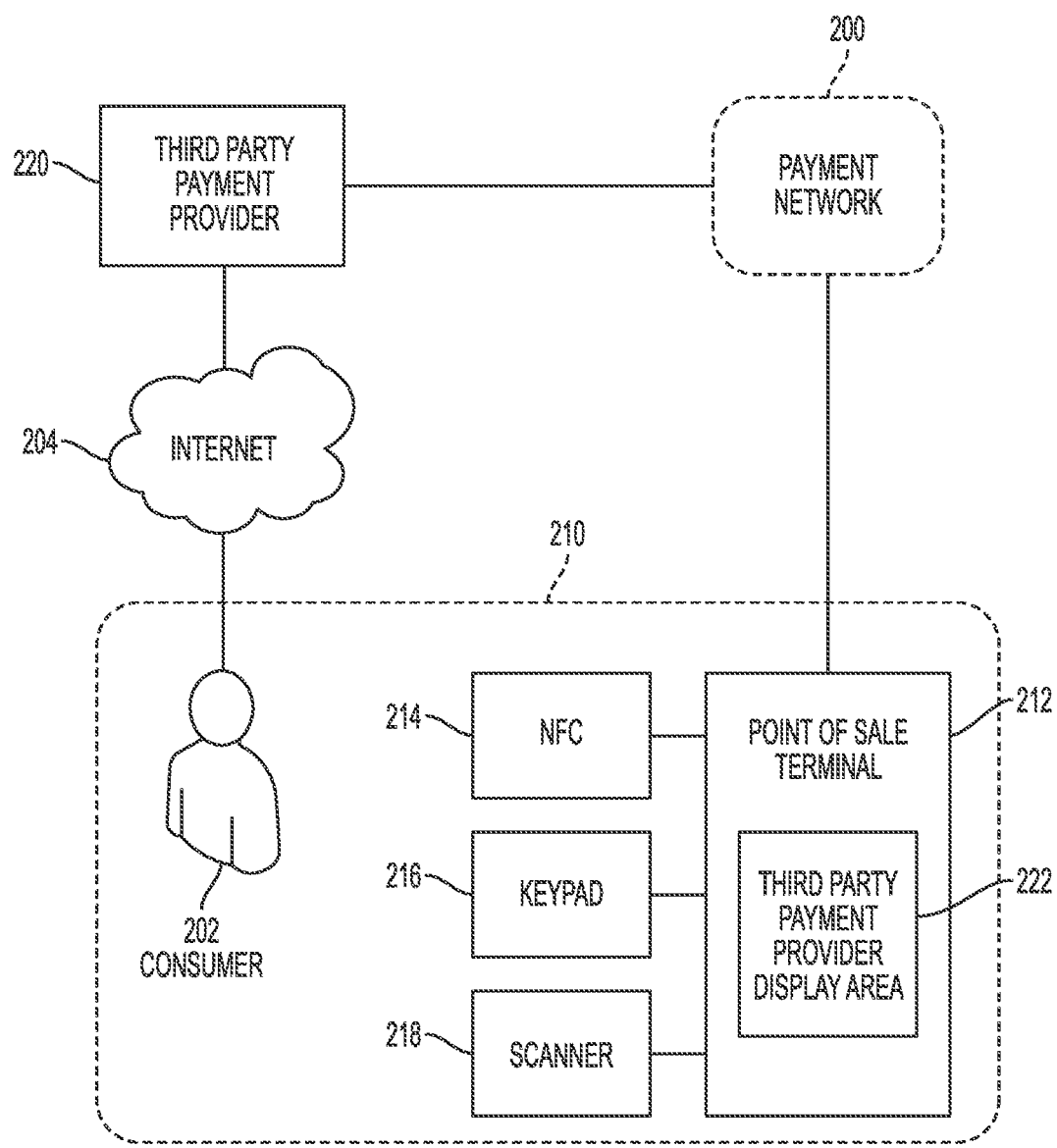
FIG. 2 is a block diagram of an example of components of a third party payment capability on a point of sale terminal.

Turning to FIG. 2, an embodiment of an example system and method for facilitating deployment of third party payment capabilities to POS terminals 212 is illustrated. A consumer 202 desires to pay for goods or services from a merchant 210 using payment other than cash, check, or a physical payment card, which is illustrated as third party payment provider 220. The consumer 202 checks-in at the merchant 210 with the third party payment provider 220, for example by checking-in with the third party payment provider 220 over the Internet 204 using a mobile phone. A consumer 202 can check-in numerous different ways. In a first configuration, the consumer 202 can use a mobile computing device, such as a mobile phone, to provide identifying information about the merchant 210 to the third party payment provider 220. The identifying information can be any suitable information. For example, if the consumer 202 is at a store associated with the merchant 210, the consumer 202 can provide the name of the merchant 210 or the location of the store to the third party payment provider 220. In another configuration, the mobile computing device can provide the location of the store to the third party payment provider 220 using global positioning system information, network triangulation computations, WiFi network identification, or other suitable position information. The third party payment provider 220 can determine the appropriate merchant 210 and store from the position information provided by the mobile computing device. In still other configurations, the mobile computing device can provide identification of the merchant 210 from a scanned code, such as a QR code or bar code scanned by the mobile computing device at the store, or from a suitable code provided by the merchant 210 to the mobile computing device through near field communications. For example, a consumer 202 can place their mobile computing device near a sensor or beacon at the store that is configured for near field communications. Other suitable methods of determining the store, location, andior merchant 210 can also be utilized.

When the consumer 202 checks-in, the consumer 202 can provide additional information to the third party payment provider 220. For example, the consumer 202 can provide gratuity information such as a percentage tip or a fixed tip. For example, if the consumer 202 is at a restaurant or similar venue, the consumer 202 can check-in after receiving the bill, allowing the consumer 202 to see the amount due to the merchant 210 before the consumer 202 adds a gratuity. In a configuration, the bill can include a QR code or other identifying information to facilitate the check-in process at the merchant 210 with the third party payment provider 220. During check-in, the consumer 202 can configure their digital wallet to use the desired bank account, payment card, or line of credit to be used in processing the transaction at the merchant 210.

Once a consumer 202 has checked-in, identifying indicia of the consumer 202 can be provided to the point of sale terminal 212 of the merchant 210, for example via an authentication notification which can be a message sent to the point of sale terminal 212. In a configuration, the third party payment provider 220 can be periodically polled by an entity in the payment network 200, for example an acquirer processor (not shown) associated with the merchant 210 and one or more point of sale terminals 212, that receives the identifying indicia for newly checked-in consumers 202 in response to the poll. In other configurations, the third party payment provider 220 can send the identifying indicia of the consumer 202 to the acquirer processor, payment network 200, merchant 210, or point of sale terminal 212 when the consumer 202 checks-in. The point of sale terminal 212 can receive all or some of the identifying indicia. The identifying indicia can include one or more images of the consumer 202, for example one or more digital pictures of consumer's face. The identifying indicia can also include other authentication information, for example a hash of a personal identification number, a token for tokenization of transactions as would be understood by one of ordinary skill in the art, and so forth.

When the consumer checks-out, or pays for the goods or services, the identifying indicia of the consumer 202 can be used to authenticate the consumer 202. In one configuration, the point of sale terminal 212 can include a near field communication device 214. The near field communication device 214 can communicate wirelessly with the mobile computing device of the consumer 202, for example to obtain an authorization code or identifying information of the consumer 202 or of mobile device. In another configuration, the point of sale terminal 212 can include a keypad 216. The consumer 202 can enter a personal identification number on the keypad for paying using the third party payment provider 220. Other numbers or alphanumeric characters, such as temporary passwords or authorization codes, are also contemplated as would be understood by one of ordinary skill in the art. In another configuration, the point of sale terminal 212 can include a scanner 218. The consumer 202 can display a code, such as a bar code or quick response (QR) code on the display of their mobile computing device to provide identifying indicia of the consumer 202. The scanner 218 can be a handheld scanner, an embedded scanner such as is used to scan items at grocery stores, a camera, and so forth as would be understood by one of ordinary skill in the art.

Figure 3:
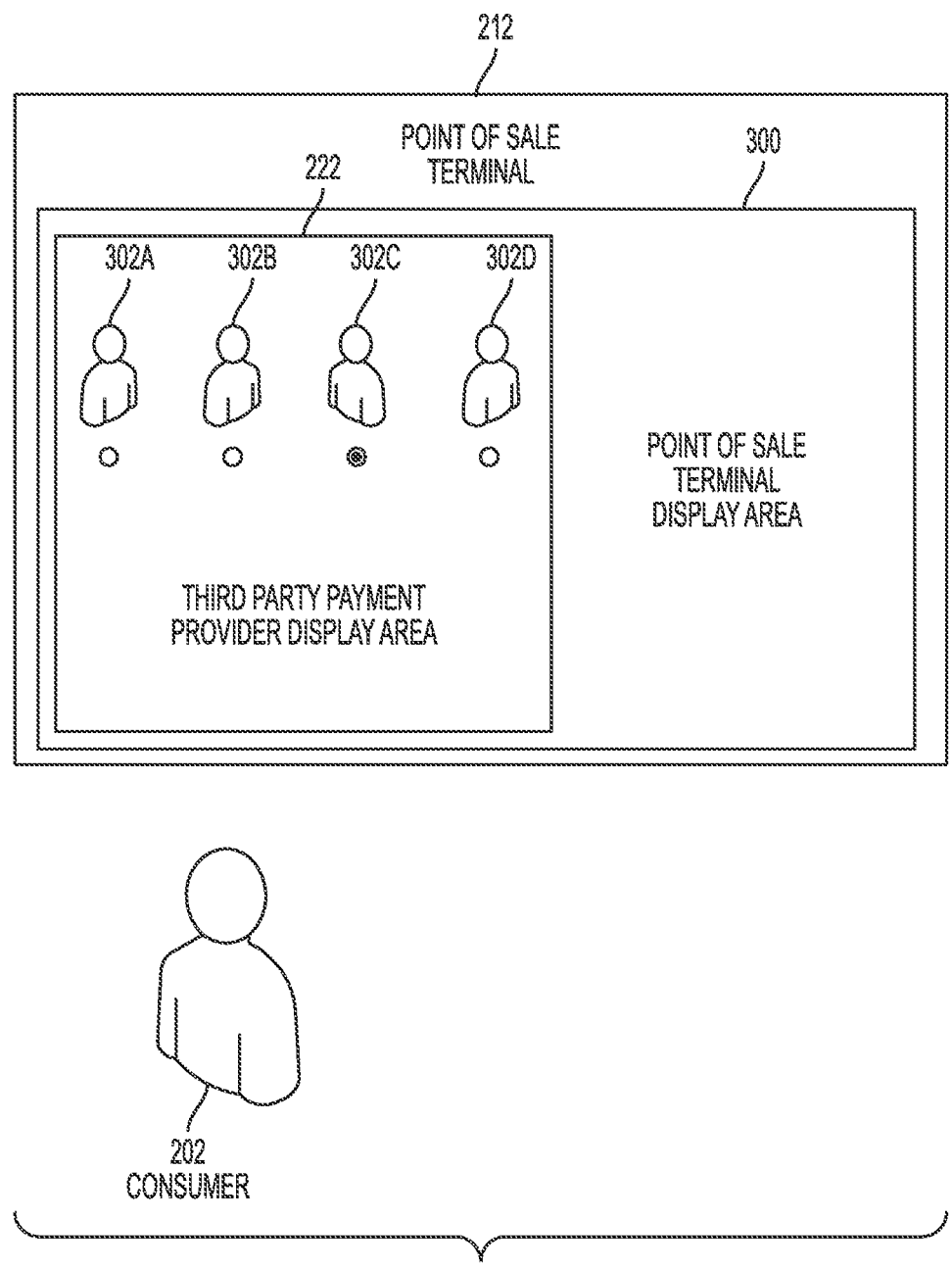
FIG. 3 is a block diagram of an example display element for a third party payment provider on a point of sale terminal.

Referring now also to FIG. 3, in another configuration the point of sale terminal 212 can include a third party payment provider display area 222. The third party payment provider display area 222 can be displayed concurrently with a portion of point of sale terminal display area 300. In various embodiments, the third party payment provider display area 222 can be a window, a widget, or a pop-up, a web page, and so forth, and be rectangular or non-rectangular, and occupy one or multiple contiguous or non-contiguous areas of the point of sale terminal display area 300.

The third party payment provider display area 222 can be instantiated using widgets from a widget hosting site or using a web services platform among other possible options as would be understood by one of ordinary skill in the art. Once the point of sale terminal 212 has been updated to support the third party payment provider display area 222, new payment modalities and new third party payment providers can be added by changing the content that is displayed in the third party payment provider display area 222 (for example, the web page, window, widget, or pop-up). The third party payment provider display area 222 advantageously allows point of sale terminals 212 to display new third party payment modalities based on content hosted on other systems instead of requiring an update to the code or instructions executing on the point of sale terminal 212 itself. If desirable, the new payment modalities and support for other third party payment providers also can be added to the software or firmware of the point of sale terminal 212 so that the point of sale terminal can natively support those new payment modalities and third party payment providers. However, the third party payment provider display area 222 facilitates rapid development and deployment of new payment modalities and support for additional third party payment providers without requiring updates to the software or firmware of each point of sale terminal 212.

In an embodiment, the third party payment provider display area 222 can display one or more identifying indicia that allow the merchant 210 to authenticate the consumer 202. For example, the identifying indicia can include a picture of each consumer 302A, 302B, 302C, 302D that is checked-in with the merchant 210 through the check-in process described above. The third party payment provider display area 222 can receive the identifying indicia through a message, or an authentication notification, from the third party payment provider. The merchant 210 can compare the consumer 202 with the picture of each consumer 302A, 302B, 302C, 302D, and select the picture of the consumer 302C that matches the consumer 202. Other identifying indicia of the consumer 202 can also be compared to authenticate the consumer's identity such as the name of the consumer 202, a driver's license number of the consumer 202, a payment card number, or a subset of digits, of a payment card in a digital wallet associated with the consumer 202, a security question of personal information known to the consumer 202, and so forth.

The point of sale terminal 212 can generate a payment request for payment by the third party payment provider 220. The payment request can include information such as information identifying the merchant to the acquirer processor or other party of the payment network 200, the payment amount, which can include a gratuity, identifying indicia for the consumer, authentication information such as whether the consumer was authenticated by the merchant 210 using images of the consumer 202, and/or authentication information such as personal identification number entered on the keypad 216 by the consumer, a code scanned by the scanner 218, or information about the consumer 202 or mobile device received via near field communication handshake, or any other suitable authentication information.

The payment request can be packaged into a data structure and sent to the acquirer processor or other transaction processing entity in the payment network 200 for processing. Suitable data structures can include, but are not limited to, proprietary data structures, or data structures defined in a suitable notation such as Abstract Syntax Notation One (ASN.1) or Java Script Object Notation (JSON), or any other suitable encoding formats or data structure as would be understood by one of ordinary skill in the art. In various embodiments, a mobile wallet service can be used or a third party payment provider's digital wallet can be accessed. The consumer 202 can configure the digital wallet to use the desired bank account, payment card, or line of credit to be used in processing the transaction. The acquirer processor can process the transaction with the third party payment provider 220, and the point of sale terminal 212 can receive confirmation of a successful transaction from the payment network 200. If not successful, the point of sale terminal 212 can receive information indicating why payment was not able to be made through the third party payment provider 220.

In an embodiment, the system can be configured to accept third party payment transactions from point of sale terminals 212 during a restricted set of hours, for example during the merchant's 210 store hours. In a configuration, the merchant 210 can determine the store hours, thereby allowing the merchant 210 to deviate from normal store hours during holidays, special events, emergencies, and other normal business hours. In a configuration, when the merchant 210 is closed, consumers 202 are unable to check-in at the merchant 210.

In an embodiment, the system can be configured to accept third party payment transactions from point of sale terminals 212 based at least in part on geography. For example, the third party payment provider 220 transactions can be configured to work when the consumer 202 making the payment is determined to be within a specific geographic range of positions, such as within a particular store or set of stores of a merchant 210, or within a threshold geographic distance of a store or set of stores, sometimes referred to as geo-fencing. Similarly, when a consumer 202 moves away from the merchant 210 or store, the consumer can be checked-out. Similarly, a consumer can be checked-out after a predetermined period of time has elapsed.

In an embodiment, prior to allowing consumers 202 to check-in to the merchant 210, the merchant 210 and one or more stores associated with the merchant 210 can be "onboarded" onto the system. Onboarding can include entering any suitable identifying indicia about the merchant 210 and stores, such as merchant or store name, account number with an acquirer processor, store addresses, phone numbers, store position or positions such as GPS or global positioning system coordinates, the type of business, store hours, type of transactions, transaction amount limits, whether payment would include tipping, and so forth.

Figure 4:
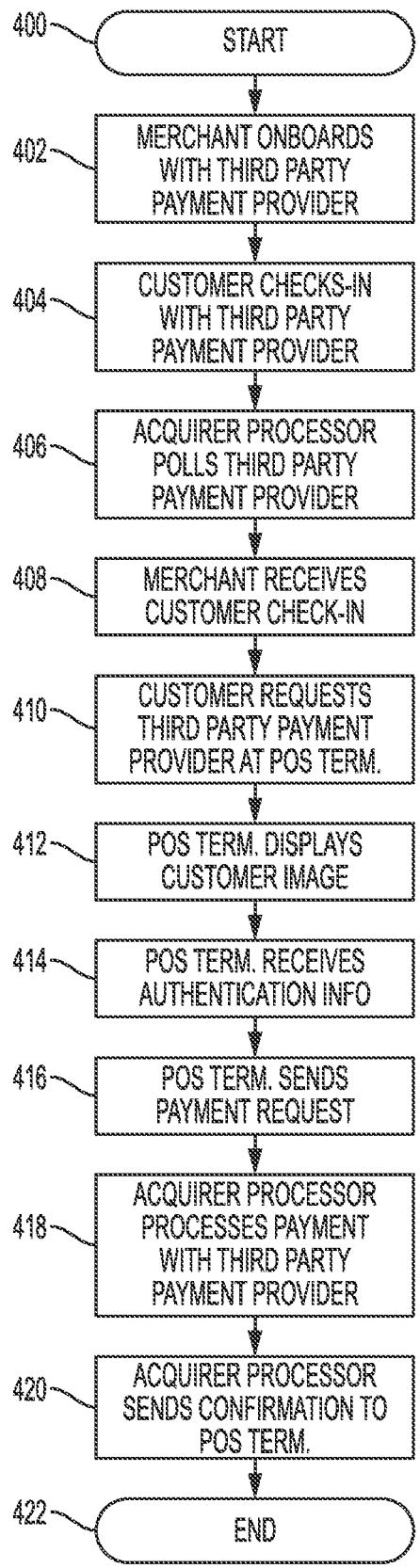
FIG. 4 is a flow diagram of an example process for payments via a third party payment provider on a point of sale terminal.

Referring now also to FIG. 4, an example flow diagram of an embodiment of a point of sale terminal configured to allow payments from third party payment providers. Processing begins at start block 400 and continues to process block 402.

At process block 402, a merchant onboards with a third party payment provider, as described above. Processing continues to process block 404.

At process block 404, a customer optionally checks-in with the third party payment provider to indicate that the customer intends to make a purchase from a merchant using the third party payment provider as the payment source. Processing continues to process block 406.

At process block 406, an acquirer processor, or another suitable system in the payment network, optionally polls the third party payment provider and determines that a customer has checked-in with the third party payment provider. The acquirer processor receives check-in information that can include identifying indicia about the customer such as the customer's name, a digital image of the customer for authenticating the customer, the merchant, and so forth as described above. Processing continues to process block 408. In an alternative embodiment, the point of sale system polls the third party payment provider and determines that a customer has checked-in with the third party payment provider. The point of sale system can include one or more point of sale terminals. In this embodiment, the point of sale system receives the check-in information. The check-in information can be distributed to one or more point of sale terminals. In a configuration, the point of sale terminal polls the third party payment provider and receives the check-in information. In this embodiment, processing skips process block 408 and continues to process block 410.

At process block 408, the acquirer processor optionally sends the customer check-in information to the merchant. The information can be sent in a message, for example an authentication notification as described above. Processing continues to process block 410.

At process block 410, the customer requests to pay the merchant using the third party payment provider, for example when checking-out at the point of sale terminal of the merchant. Processing continues to process block 412.

At process block 412, the merchant selects the third party payment provider on the point of sale terminal, and the point of sale terminal displays a window, widget, pop-up or other suitable display area for the third party payment provider on the display of the point of sale terminal. The display area for the third party payment provider optionally can display images of customers that are checked-in with the merchant at the particular store, venue, or location. The display area optionally can also provide other identifying information about customers that are checked-in, such as the names or addresses of the customers. Processing continues to process block 414.

At process block 414, the merchant optionally can review the displayed images of the customers, or other identifying information, and select the image on the display that matches the customer that is checking-out at the point of sale terminal. Additional, or other, authentication information can be obtained by the point of sale terminal as described above. For example, the customer can enter a personal identification number or password via a keypad or keyboard. The customer can display a code, such as a bar code or quick response code, on the screen of the customer's mobile computing device and have the point of sale terminal scan the code. The customer can place their mobile computing device near a near field communication sensor associated with the point of sale terminal in order to send a code that identifies the customer and mobile computing device. Processing continues to process block 416.

At process block 416, the point of sale terminal can send a payment request to the acquirer processor. The payment request can include the authentication result from the third party payment provider authentication steps, for example an indication that the customer was identified by the customer image, and/or the other authentication information provided by the customer via the keypad, or by the customer's mobile computing device via scanning or near field communication steps described in process block 414. Processing continues to process block 418. In a first alternative embodiment, the point of sale terminal sends the payment request, including the authentication result, to the third party payment provider. In a second alternative embodiment, the customer can send a payment request directly to the third party payment provider, for example from an app executing on the customer's mobile computing device. In these alternative embodiments, the point of sale terminal receives a payment confirmation (or an indication that the payment was declined) from the third party payment provider and processing terminates at end block 422.

At process block 418, the acquirer processor can process the payment request with the third party payment provider. Processing continues to process block 420.

At process block 420, the acquirer processor can send a payment confirmation to the point of sale terminal to indicate that the payment was successful, or a suitable indication if the payment was declined by the third party payment provider. Processing terminates at end block 422.

In alternative embodiments, the point of sale terminal can be configured to allow payments from third party payment providers using various different modalities. In a first alternative embodiment, the point of sale terminal can be configured to allow a customer to log on to a third party payment provider and make a payment to the merchant. For example the third party payment provider area can display a browser window, or a similar screen, that links to a third party payment provider in a similar fashion to how a user's home computer or mobile computing device would display a browser window for making a payment to another party using a third party payment provider. In a configuration, information about one or both parties can be prepopulated in the third party payment provider display area, for example a merchant identifier can be prepopulated in the payment request.

In a second alternative embodiment, the customer can perform the check-in at the point of sale terminal in the third party payment provider display area. In a configuration, the customer check-in can be performed at a kiosk or another terminal of the merchant.

In a third alternative embodiment, the third party payment provider display area can provide a user interface for the customer to select a third party payment provider, for example from a list of third party payment providers. The customer can then perform actions with the third party payment provider to make a payment to the merchant as described above in any of the examples.

In a fourth alternative embodiment, the point of sale terminal can interact with the user's mobile computing device, for example by scanning a code on the screen of the screen of the mobile computing device or by transmitting or receiving information using near field communication capabilities of the mobile computing device, or any other computing device that may be tethered or in communication with the customer's mobile computing device.

Generally, the third party payment provider display area and the point of sale terminal can be configured to support any number of suitable payment modalities as would be understood by one of ordinary skill in the art. Advantageously, a point of sale terminal that supports the third party payment provider display area can support new or improved payment modalities with requiring an update to the code, or instructions, for executing the point of sale terminal itself. Instead, data for the new or updated payment modality can be uploaded to a data server, and the third party payment provider display area can download the data and present the new or updated payment modality to the customer. For example, if the third party payment provider display area displays a browser window, the instructions for that browser window on the point of sale terminal do not have to updated to support a new payment modality; instead, data stored on a separate data server can be downloaded and used by the browser window to present the new payment modality to the customer. This can facilitate rapid deployment of new payment modalities to point of sale terminals without modifying instructions of the point of sale terminal itself.

Figure 5:
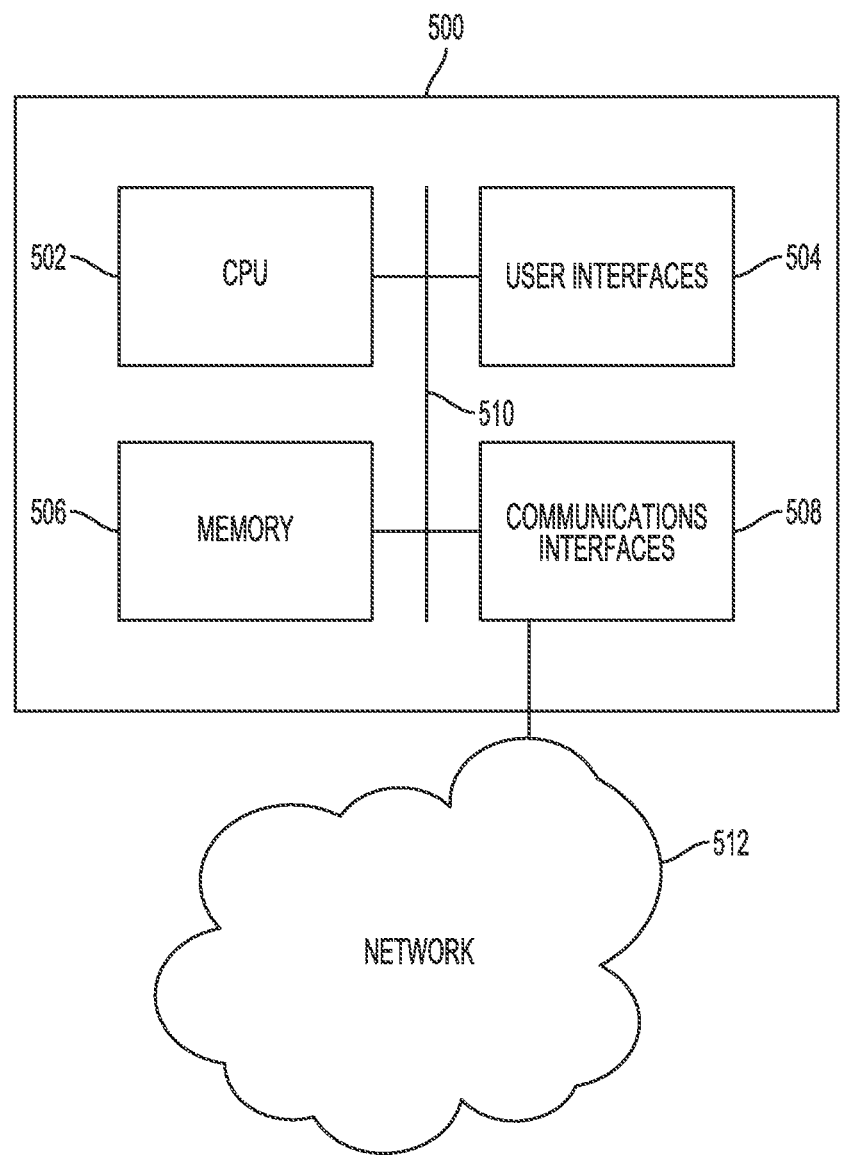
FIG. 5 is a block diagram of an example computing device.

The systems and processes described above can be performed on or between one or more computing devices 500. Referring now to FIG. 5, an example computing device 500 is presented. A computing device 500 can be a server, a computing device that is integrated with other systems or subsystems, a mobile computing device such as a smart phone, a cloud-based computing capability, and so forth. The computing device 500 can be any suitable computing device as would be understood in the art, including without limitation, a custom chip, an embedded processing device, a tablet computing device, a point of sale terminal 212 associated with a merchant 210, a back office system of a merchant 210, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static ram (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wired data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as a WiFi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 400 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A point of sale terminal of a merchant, comprising:
a display configured to display a third party payment provider display area;
a processor;
network interface configured for data communication with a payment processing network;
a memory storing instructions that, when executed by the processor, cause the processor to perform operations comprising:
receiving, via the network interface, data for presenting a payment modality for a third party payment provider, the received data being one of a web page, a window, a widget, or a pop-up hosted on a third party server;
presenting the payment modality in the third party payment provider display area, wherein presenting the payment modality does not modify an instruction of the point of sale terminal, and wherein the presented payment modality presents a user interface allowing a consumer to perform one or more of: logging in to an account of the third party payment provider, checking in in at the merchant with the third party payment provider or selecting a third party payment provider from a list of third party payment providers;
sending, via the network interface, a payment request for payment by the third party payment provider according to the payment modality; and
receiving, via the network interface, a confirmation of payment by the third party payment provider.

2. The point of sale terminal of claim 1, wherein the operations performed by the processor further comprise:
receiving, via the network interface, an authentication notification for authenticating a consumer for a transaction at the merchant with a third party payment provider, the authentication notification including one or more of an identifying indicia of the consumer, and a gratuity provided by the consumer; and
receiving a consumer authentication selection,
wherein the payment request includes the consumer authentication selection.

3. The point of sale terminal of claim 2, wherein the consumer authentication selection authenticates the consumer using the identifying indicia of the consumer.

4. The point of sale terminal of claim 3, wherein the identifying indicia of the consumer is an image of the consumer, wherein the image of the consumer is displayed in the third party payment provider display area, and wherein the consumer is authenticated by a selection of the image of the consumer that is displayed in the third party payment provider display area.

5. The point of sale terminal of claim 3, wherein the consumer authentication selection includes one or more of a personal identification number from the consumer or a code from a mobile device of the consumer.

6. The point of sale terminal of claim 5, wherein the code is selected from group consisting of a scanned quick response code from a display of the mobile device, and a near field communication code received from the mobile device.

7. A method, comprising:
receiving, via a network interface configured for data communication with a payment processing network, data for presenting a payment modality for a third party payment provider, the received data being one of a web page, a window, a widget, or a pop-up hosted on a third party server;
presenting the payment modality in a third party payment provider display area on a point of sale terminal of a merchant, wherein presenting the payment modality does not modify an instruction of the point of sale terminal, and wherein the presented payment modality presents a user interface allowing a consumer to perform one or more of: logging in to an account of the third party payment provider, checking in in at the merchant with the third party payment provider or selecting a third party payment provider from a list of third party payment providers;
sending, via the network interface, a payment request for payment by the third party payment provider according to the payment modality from the point of sale terminal for a transaction with a consumer at the point of sale terminal; and
receiving, via the network interface, a confirmation of payment by the third party payment provider.

8. The method of claim 7, further comprising:
receiving a consumer authentication selection at the point of sale terminal.

9. The method of claim 8, wherein receiving a consumer authentication selection includes receiving one or more of a personal identification number from the consumer or a code from a mobile device of the consumer.

10. The method of claim 9, wherein the code is selected from group consisting of a scanned quick response code from a display of the mobile device, and a near field communication code received from the mobile device.

11. The method of claim 7, further comprising:
receiving a notification, at the point of sale terminal, that the consumer has checked-in at the merchant with the third party payment provider,
wherein the notification includes one or more of an identifying indicia of the consumer, and a gratuity provided by the consumer when the consumer checked-in.

12. The method of claim 11, wherein the consumer authentication selection authenticates the consumer using the identifying indicia of the consumer.

13. The method of claim 11, wherein the identifying indicia of the consumer is an image of the consumer, wherein the image of the consumer is displayed in the third party payment provider display area on the point of sale terminal, and wherein the consumer is authenticated by a selection of the image of the consumer that is displayed in the third party payment provider display area.

14. The method of claim 7, wherein the third party payment provider display area on the point of sale terminal is a web page configured to:
- receive a payment amount of the transaction from the point of sale terminal;
- receive the consumer authentication selection;
- send the payment request for payment by the third party payment provider that includes the payment amount and the consumer authentication selection;
- receive a confirmation of payment by the third party payment provider; and
- send a notification to the point of sale terminal of the confirmation of payment.

15. A computer-implemented payment processing method, comprising:
- sending, to a point of sale terminal of a merchant, data for presenting a payment modality in a third party payment provider display area of the point of sale terminal, the data being one of a web page, a window, a widget, or a pop-up hosted on a third party server, wherein presenting the payment modality does not modify an instruction of the point of sale terminal, and wherein presenting the payment modality presents a user interface allowing a consumer to perform one or more of: logging in to an account of the third party payment provider, checking in in at the merchant with the third party payment provider or selecting a third party payment provider from a list of third party payment providers;
- receiving a payment request from the point of sale terminal for payment by the third party payment processor, the payment request including an authentication result data;
- sending a payment authorization request to the third party payment processor;
- receiving a payment confirmation from the third party payment processor; and
- sending a notification of payment to the point of sale terminal.

16. The computer-implemented payment processing method of claim 15, further comprising:
- polling a third party payment processor for customer check-in data associated with a customer check-in at a merchant;
- receiving the customer check-in data including an authentication data for authenticating the customer at a point of sale terminal of the merchant; and
- sending the customer check-in data to the point of sale terminal.

17. The computer-implemented payment processing method of claim 16, wherein the authentication data includes at least one digital image of the customer.

18. The computer-implemented payment processing method of claim 17, wherein the authentication result data includes a confirmation that the customer was authenticated with the digital image of the customer.

19. The computer-implemented payment processing method of claim 16, wherein the authentication result data includes a data selected from the group consisting of a personal identification number, a hash of a personal identification number, a password, a hash of a password, a token associated with the customer and merchant, a scanned code, a scanned quick response code, a code provided by a mobile communication device, and a code provided through a near field communication session with a mobile communication device.

20. The computer-implemented payment processing method of claim 16, wherein the received customer check-in data includes a gratuity data, and wherein the payment request from the point of sale terminal includes a gratuity based at least in part on the gratuity data.

* * * * *